United States Patent
Aikyo et al.

(10) Patent No.: US 11,364,965 B2
(45) Date of Patent: Jun. 21, 2022

(54) SADDLE RIDING VEHICLE AIRBAG DEVICE

(71) Applicant: HONDA MOTOR CO., LTD., Tokyo (JP)

(72) Inventors: Yutaka Aikyo, Wako (JP); Takashi Sato, Wako (JP); Makoto Fuma, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 337 days.

(21) Appl. No.: 16/648,916

(22) PCT Filed: Jun. 20, 2018

(86) PCT No.: PCT/JP2018/023424
§ 371 (c)(1),
(2) Date: Mar. 19, 2020

(87) PCT Pub. No.: WO2019/064737
PCT Pub. Date: Apr. 4, 2019

(65) Prior Publication Data
US 2020/0283083 A1      Sep. 10, 2020

(30) Foreign Application Priority Data
Sep. 29, 2017    (JP) .............................. JP2017-190775

(51) Int. Cl.
*B62J 27/20*       (2020.01)
*B60R 21/217*    (2011.01)
(Continued)

(52) U.S. Cl.
CPC ............. *B62J 27/20* (2020.02); *B60R 21/217* (2013.01); *B60R 21/26* (2013.01); *B60R 2021/0088* (2013.01)

(58) Field of Classification Search
CPC ..................................................... B60R 27/20
See application file for complete search history.

(56) References Cited

U.S. PATENT DOCUMENTS

| 2005/0023803 | A1 | 2/2005 | Kuroe et al. |
| 2007/0052215 | A1 | 3/2007 | Miyata |
| 2011/0074138 | A1* | 3/2011 | Kuroki ................. B60R 21/231 |
| | | | 280/730.1 |

FOREIGN PATENT DOCUMENTS

| DE | 102004016364 A1 * | 11/2005 | ............. B60R 21/16 |
| EP | 1249386 A1 * | 10/2002 | ........... B60R 21/231 |

(Continued)

OTHER PUBLICATIONS

Japanese Office Action with English translation dated Feb. 2, 2021, 5 pages.

(Continued)

*Primary Examiner* — Nicole T Verley
(74) *Attorney, Agent, or Firm* — Rankin, Hill & Clark LLP

(57) ABSTRACT

A saddle riding vehicle airbag device can be disposed compactly and the airbag can be deployed vertically upward. In the saddle riding vehicle airbag device provided with a retainer that is provided in front of a seat for a rider, an inflator and an airbag that is housed in the retainer, is inflated by means of a gas discharged from the inflator and is deployed in front of the rider, in which the retainer is provided with an L-shaped airbag passage that causes the airbag to deploy upward in a left-right direction, and, in a deployed state, the airbag is formed bilaterally asymmetrical with respect to a left-right center line of the airbag.

5 Claims, 13 Drawing Sheets

(51) Int. Cl.
*B60R 21/26* (2011.01)
*B60R 21/00* (2006.01)

(56) References Cited

FOREIGN PATENT DOCUMENTS

| EP | 1375323 A2 | * | 1/2004 | ............. B62J 27/00 |
|---|---|---|---|---|
| EP | 2096022 A1 | * | 9/2009 | ............. B62J 27/00 |
| JP | 2003104159 A | * | 4/2003 | ......... B60R 21/2171 |
| JP | 2009208516 A | * | 9/2009 | ............. B62J 27/00 |
| JP | 2011073560 A | * | 4/2011 | |
| JP | 5383411 B2 | * | 1/2014 | ........... B60R 21/233 |
| JP | 2015-145152 | | 8/2015 | |
| JP | 5979890 B2 | * | 8/2016 | |
| WO | WO-2018221179 A1 | * | 12/2018 | ............. B62J 27/20 |
| WO | WO-2019207776 A1 | * | 10/2019 | ............. B62J 27/20 |

OTHER PUBLICATIONS

International Search Report, dated Aug. 14, 2018 (Aug. 14, 2018), 1 page.
International Preliminary Examination Report dated Jul. 29, 2019, 6 pages.
Indian Office Action dated Jul. 15, 2021, 6 pages.
Indonesian Office Action with English translation, dated May 21, 2021, received Aug. 30, 2021, 9 pages.
International Preliminary Examination Report, dated Apr. 2, 2020 (Apr. 2, 2020), 5 pages.

* cited by examiner

SADDLE RIDING VEHICLE AIRBAG DEVICE

TECHNICAL FIELD

The present invention relates to a saddle riding vehicle airbag device.

BACKGROUND ART

Conventionally, saddle riding vehicle airbag devices in which the airbag is easily deployed upward by discharging gas upward from an inflator provided at the bottom of the airbag device are known (e.g., see Patent Literature 1).

CITATION LIST

Patent Literature

Patent Literature 1: Japanese Patent Application Laid-Open No. 2015-145152

SUMMARY OF INVENTION

Technical Problem

When the inflator is disposed oriented in a direction in which the gas is discharged upward from the inflator as in the case of the prior art, the airbag device is likely to increase in size in a front-rear direction. The saddle riding vehicle airbag device needs to dispose compactly in the front-rear direction and the airbag needs to deploy vertically upward as much as possible to protect the rider appropriately.

The present invention has been implemented in view of the aforementioned circumstances and it is an object of the present invention to provide a saddle riding vehicle airbag device in which the airbag device is disposed compactly and the airbag is enabled to be deployed vertically upward.

Solution to Problem

The present Description includes whole contents of Japanese Patent Application No. 2017-190775 filed on Sep. 29, 2017.

The present invention is a saddle riding vehicle airbag device including a retainer (41) that is provided in front of a seat (13) for a rider, an inflator (43) and an airbag (42, 242) that is housed in the retainer (41), is inflated by means of a gas discharged from the inflator (43) and is deployed in front of the rider, in which the retainer (41) is provided with an L-shaped airbag passage (48) that causes the airbag (42, 242) to deploy upward in a left-right direction and, in a deployed state, the airbag (42, 242) is formed bilaterally asymmetrical with respect to a left-right center line (C) of the airbag (42, 242).

In the above invention, the airbag (42, 242) may be provided with a proximal end part (100, 200) that is located in the airbag passage (48) in a deployed state and an outside deployment part (101) that deploys outside the airbag passage (48) in a deployed state, and the proximal end part (100, 200) may be formed bilaterally asymmetrical with respect to the center line (C).

In the above invention, the outside deployment part (101) may be formed bilaterally symmetrical with respect to the center line (C). According to this configuration, the outside deployment part may be formed bilaterally symmetrical with respect to the center line.

Furthermore, in the above invention, the proximal end part (100, 200) may be curved upward in the left-right direction. According to this configuration, the proximal end part may be curved upward in the left-right direction.

Furthermore, in the above invention, the inflator (43) may be disposed at a position bilaterally apart from the center line (C) in the proximal end part (100, 200).

Furthermore, in the above invention, the airbag (242) may be provided internally with a flow-regulation cloth (210) to guide the direction of the gas.

Advantageous Effect of Invention

According to the saddle riding vehicle airbag device according to the present invention, the saddle riding vehicle airbag device is provided with the retainer that is provided in front of the seat for the rider, the inflator and the airbag that is housed in the retainer, is inflated by means of a gas discharged from the inflator and is deployed in front of the rider, in which the retainer is provided with an L-shaped airbag passage that causes the airbag to deploy upward in the left-right direction and, in a deployed state, the airbag is formed bilaterally asymmetrical with respect to a left-right center line of the airbag.

According to this configuration, the L-shaped airbag passage allows the airbag to be arranged using spaces in the left-right direction and in the up-down direction, allowing the airbag device to be disposed compactly. Furthermore, since the airbag is bilaterally asymmetrical with respect to the left-right center line, the airbag is deployed upward in the left-right direction along the L-shaped airbag passage. It is thereby possible to dispose the airbag device compactly and deploy the airbag vertically upward.

In the above invention, the airbag may be provided with a proximal end part that is located in the airbag passage in a deployed state and an outside deployment part that deploys outside the airbag passage in a deployed state, in which the proximal end part may be formed bilaterally asymmetrical with respect to the center line. According to this configuration, the proximal end part located in the airbag passage can be deployed upward in the left-right direction along the L-shaped airbag passage. For this reason, the airbag can be deployed vertically upward.

In the above invention, the outside deployment part may be formed bilaterally symmetrical with respect to the center line. According to this configuration, since the outside deployment part deployed outside the retainer is bilaterally symmetrical, the outside deployment part is able to protect the rider appropriately.

Furthermore, in the above invention, the proximal end part may be curved upward in the left-right direction. According to this configuration, it is possible to deploy the proximal end part upward in the left-right direction along the curved portion. Thus, the airbag can be deployed vertically upward.

Furthermore, in the above invention, the inflator may be disposed at a position bilaterally apart from the center line in the proximal end part. According to this configuration, the gas of the inflator flows upward in the left-right direction through the airbag passage. It is thereby possible to deploy the proximal end part upward in the left-right direction and deploy the airbag vertically upward.

Furthermore, in the above invention, a flow-regulation cloth to guide the direction of the gas may be provided in the airbag. According to this configuration, since the flow direction of the gas from the inflator can be controlled by the flow-regulation cloth, it is possible to control the order of filling the airbag with the gas.

DESCRIPTION OF EMBODIMENTS

Hereinafter, an embodiment of the present invention will be described with reference to the accompanying drawings. Note that in the description, descriptions of directions such as front, rear, left, right and up and down are the same as the directions with respect to the vehicle body unless otherwise specified. A symbol "FR" shown in each drawing indicates the front of the vehicle body, a symbol "UP" indicates the upper side of the vehicle body, and a symbol "LH" indicates the left side of the vehicle body.

First Embodiment

Figure 1:
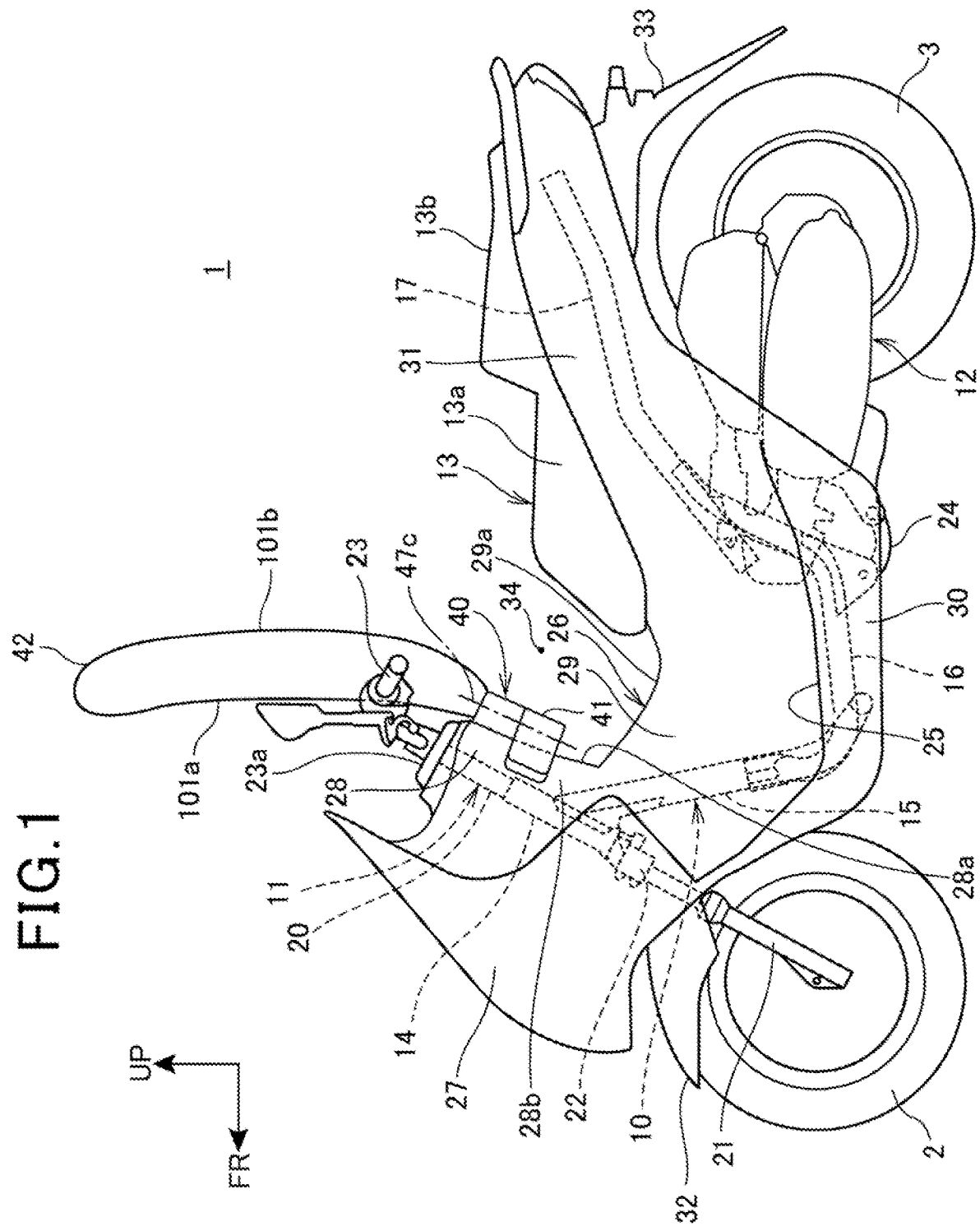
FIG. 1 is a left side view of a motorcycle according to a first embodiment of the present invention.

FIG. 1 is a left side view of a motorcycle 1 according to a first embodiment of the present invention. FIG. 1 illustrates a state of an airbag 42, which will be described later, in which the airbag is inflated and deployed. Note that FIG. 1 shows only the left side one of each component provided as a left and right pair, accompanied by each reference numeral.

The motorcycle 1 is a scooter type saddle riding vehicle including a body frame 10, a steering system 11 that steerably supports a front wheel 2, a power unit 12 supported at the rear of the body frame 10, a rear wheel 3 and a seat 13 for a rider to sit thereon in a straddled posture.

The body frame 10 includes a head pipe 14 being provided at a front end thereof, a main frame 15 that extends backward and downward from the head pipe 14, a lower frame 16 that extends backward from the bottom end of the main frame 15 and a left and right pair of rear frames 17, 17 that extend backward, rising backward from the lower frame 16. The head pipe 14 is disposed at the center of the vehicle width.

The steering system 11 includes a steering shaft 20 being pivotally supported by the head pipe 14, a left and right pair of front forks 21, 21 disposed on both left and right sides of the front wheel 2 to support the front wheel 2, a bridge member 22 fixed to the bottom end of the steering shaft 20 to connect the upper parts of the left and right front forks 21, 21 and a handle 23 which is fixed to the top end of the steering shaft 20. The handle 23 is connected to the steering shaft 20 via a handle post 23a which is fixed to the top end of the steering shaft 20.

In a side view of the vehicle, the head pipe 14 leans backward with respect to the up-down direction by a predetermined caster angle set for the motorcycle 1. The steering shaft 20 is inserted into and pivotally supported by the head pipe 14 and is disposed to be inclined rearward in a side view of the vehicle. The steering shaft 20 is positioned at the center of the vehicle width.

The power unit 12 is a unit swing engine being provided with a function of an engine as a drive source of the rear wheel 3 and a function of a swing arm that supports the rear wheel 3. The power unit 12 is pivotally supported by the body frame 10 in a freely swingable manner via a link member 24 which is provided at the front-end part.

The seat 13 is provided above the rear frame 17. The seat 13 is integrally provided with a front-side seat 13a on which the driver is seated and a rear-side seat 13b on which a fellow passenger is seated.

Step floors 25, 25 on which the driver places his/her left and right feet are provided in pairs on the right and left sides of the lower frame 16 which is positioned at the center of the vehicle width.

The motorcycle 1 includes a body cover 26 that covers the vehicle body such as the body frame 10.

The body cover 26 includes a front cover 27 that covers the upper parts of the head pipe 14 and the steering system 11 from the front side and the left and right sides, and an inner cover 28 which is continuous to the rear edge of the front cover 27 and covers the upper parts of the head pipe 14 and the steering system 11 from the rear.

The body cover 26 includes a center cover 29 which is positioned in front of and below the front-side seat 13a, an under cover 30 that covers the vehicle body from below the step floors 25, 25 and a rear side cover 31 that covers the rear frames 17, 17 under the seat 13 from sides.

The motorcycle 1 includes a front fender 32 and a rear fender 33.

The front of the center cover 29 is continuous to the bottom of the inner cover 28. The center cover 29 is positioned on the inside of the left and right legs of the driver extending from the front-side seat 13a to the step floors 25, 25. An upper edge 29a of the center cover 29 is positioned below the front-side seat 13a.

In a side view of the vehicle, the rear surface of the inner cover 28, the upper edge 29a of the center cover 29 and the front surface of the front-side seat 13a partition a straddle space 34 being recessed downward. When getting on and off the motorcycle 1, the rider can straddle the motorcycle 1 through the straddle space 34.

Figure 2:
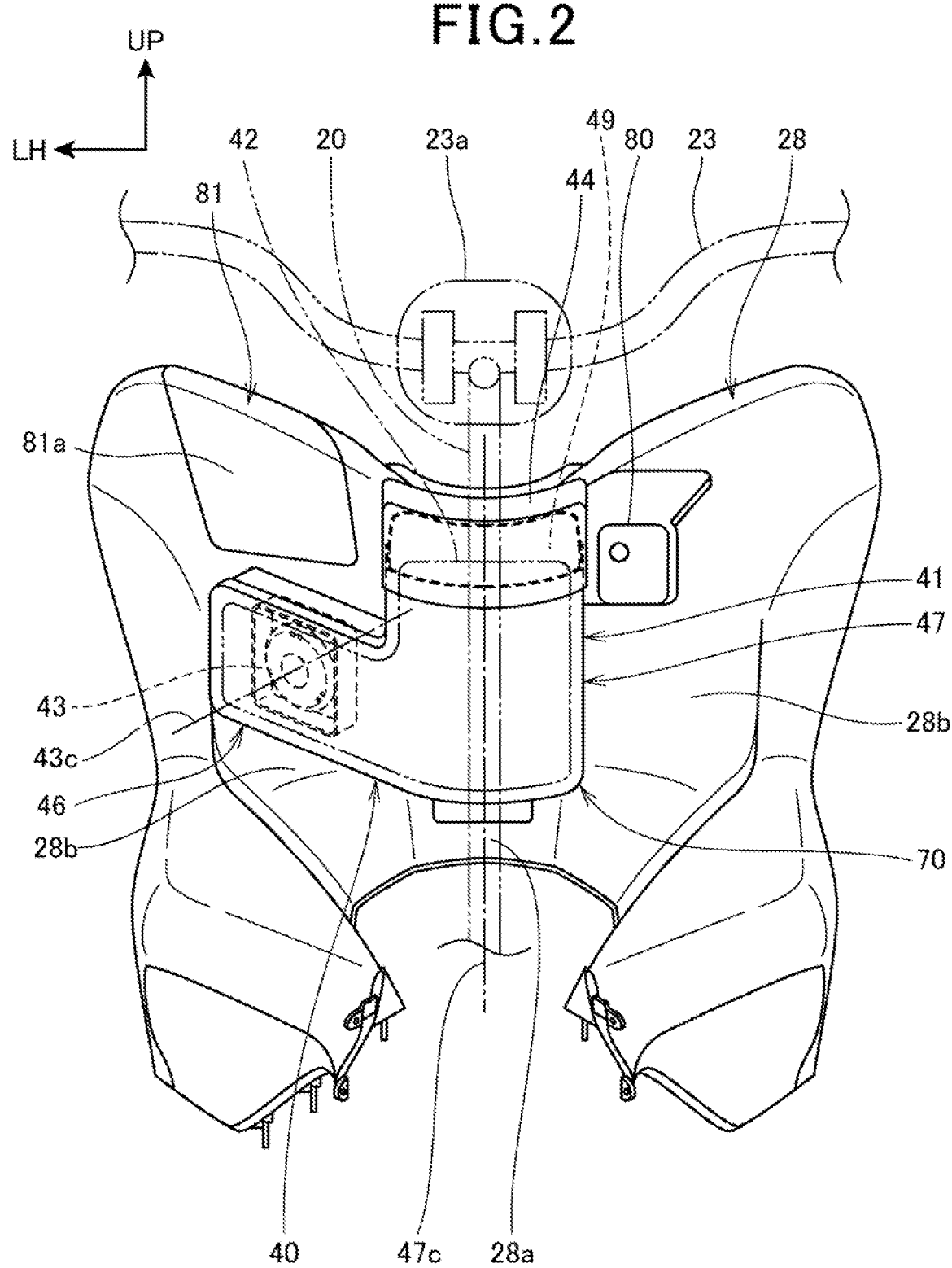
FIG. 2 is a diagram of a peripheral part of an inner cover seen from the rear side.

FIG. 2 is a diagram of a peripheral part of the inner cover 28 seen from the rear side.

As shown in FIG. 1 and FIG. 2, the motorcycle 1 includes an airbag device 40 that protects the rider from a shock. The airbag device 40 is provided on the rear surface of the inner cover 28 and is positioned in front of the driver who is seated on the front-side seat 13a. Furthermore, the airbag device 40 is also provided in the rear of the steering shaft 20 under the handle 23 and is positioned in front of the straddle space 34.

In a side view of the vehicle, the rear surface of the inner cover 28 is provided substantially parallel to the steering shaft 20 and falls rearward along the steering shaft 20.

In the upper part of the rear surface of the inner cover 28, as shown in FIG. 1 and FIG. 2, the central part 28a in the vehicle width direction located in the rear of the steering shaft 20 is located at the rearmost and the side parts 28b and 28b which are positioned on the left and right of the central part 28a are inclined so as to be located on the front side toward the outside in the vehicle width direction.

Figure 3:
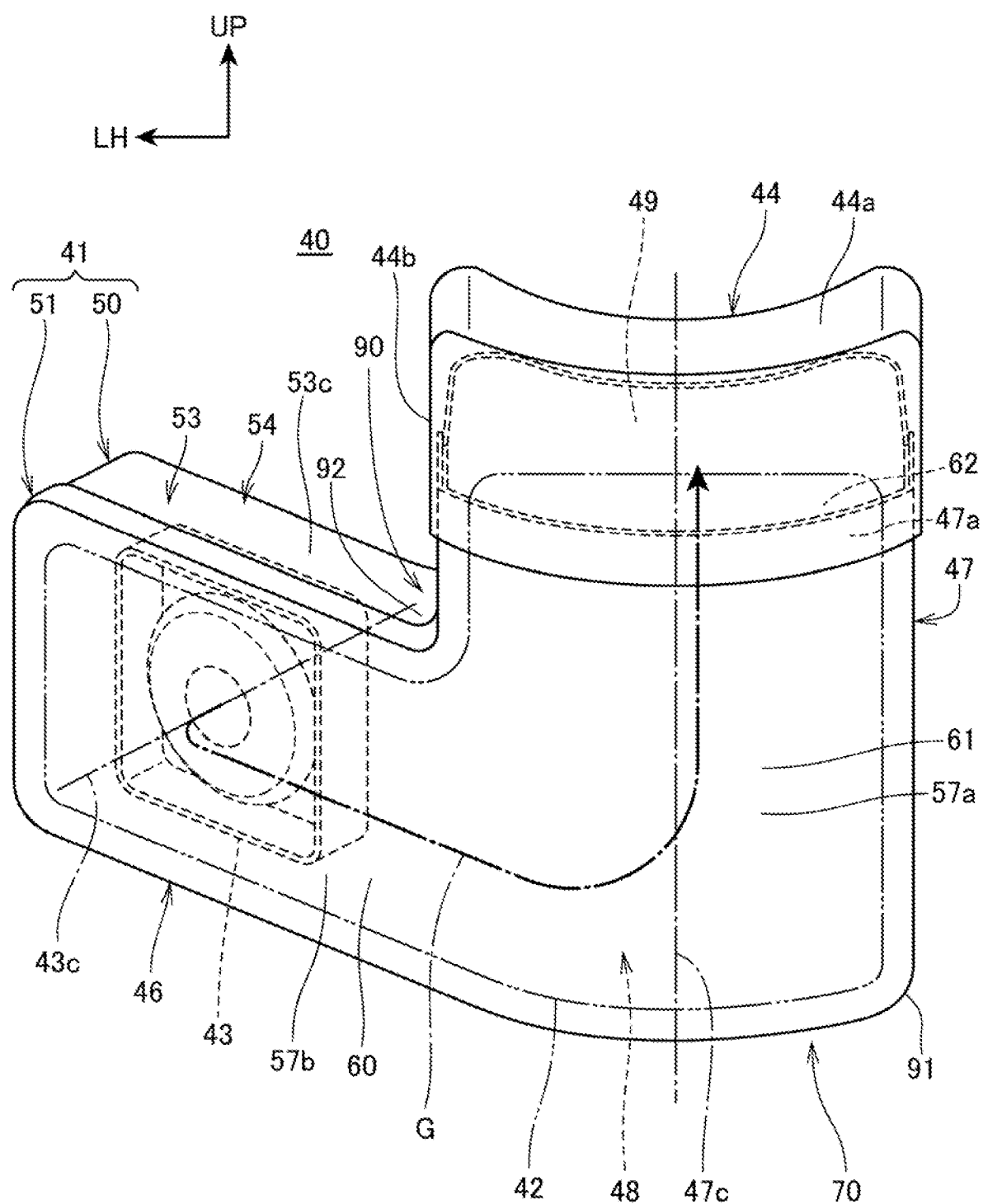
FIG. 3 is a front view of an airbag device seen from the rear side.

FIG. 3 is a front view of the airbag device 40 seen from the rear side (driver side).

The airbag device 40 includes a box-shaped retainer 41 provided in front of the rider who is seated on the seat 13, an airbag 42 housed in the retainer 41, an inflator 43 for discharging gas into the airbag 42 and a cover member 44 attached to the top of the retainer 41.

Figure 4:
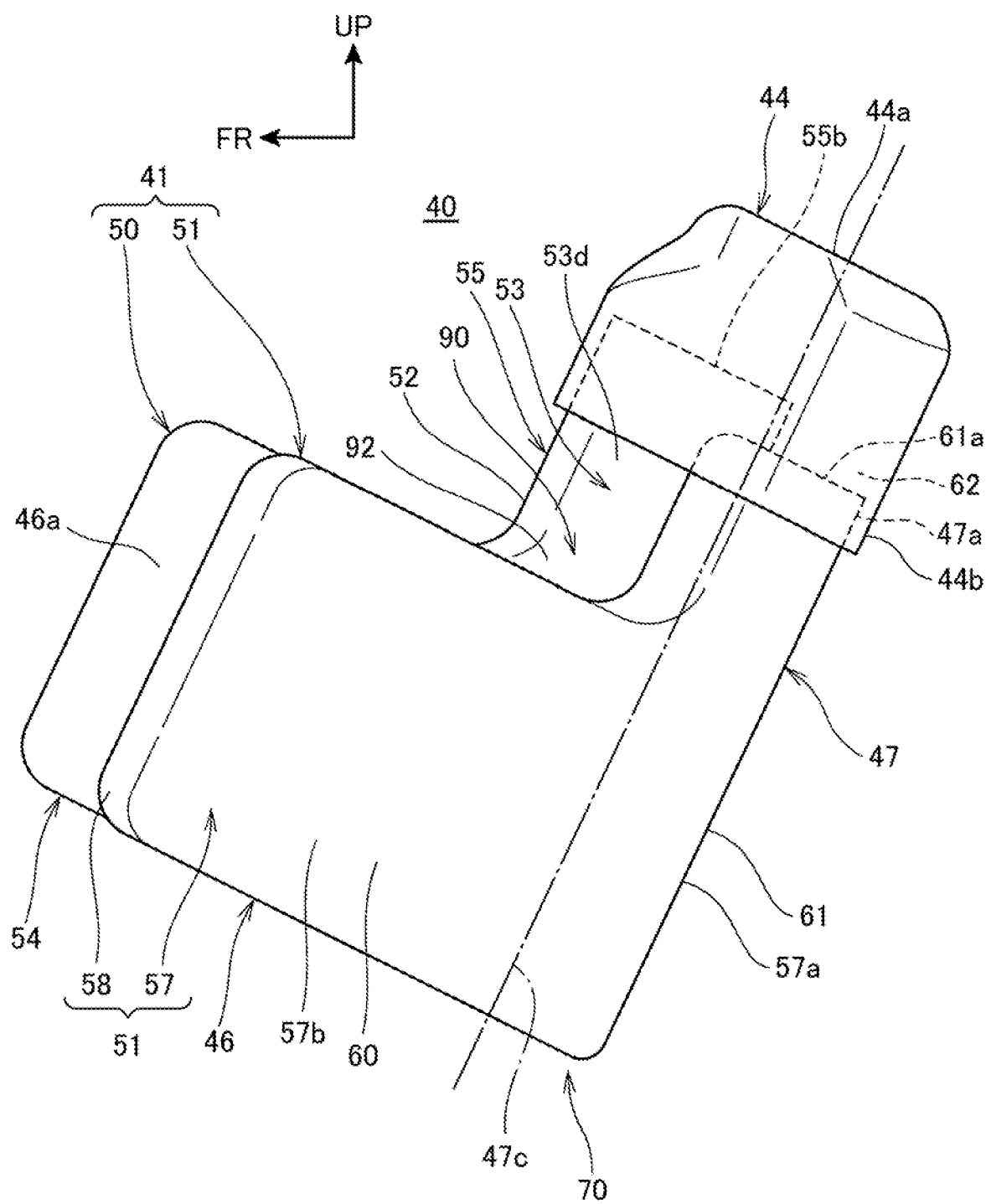
FIG. 4 is a left side view of the airbag device.
Figure 5:
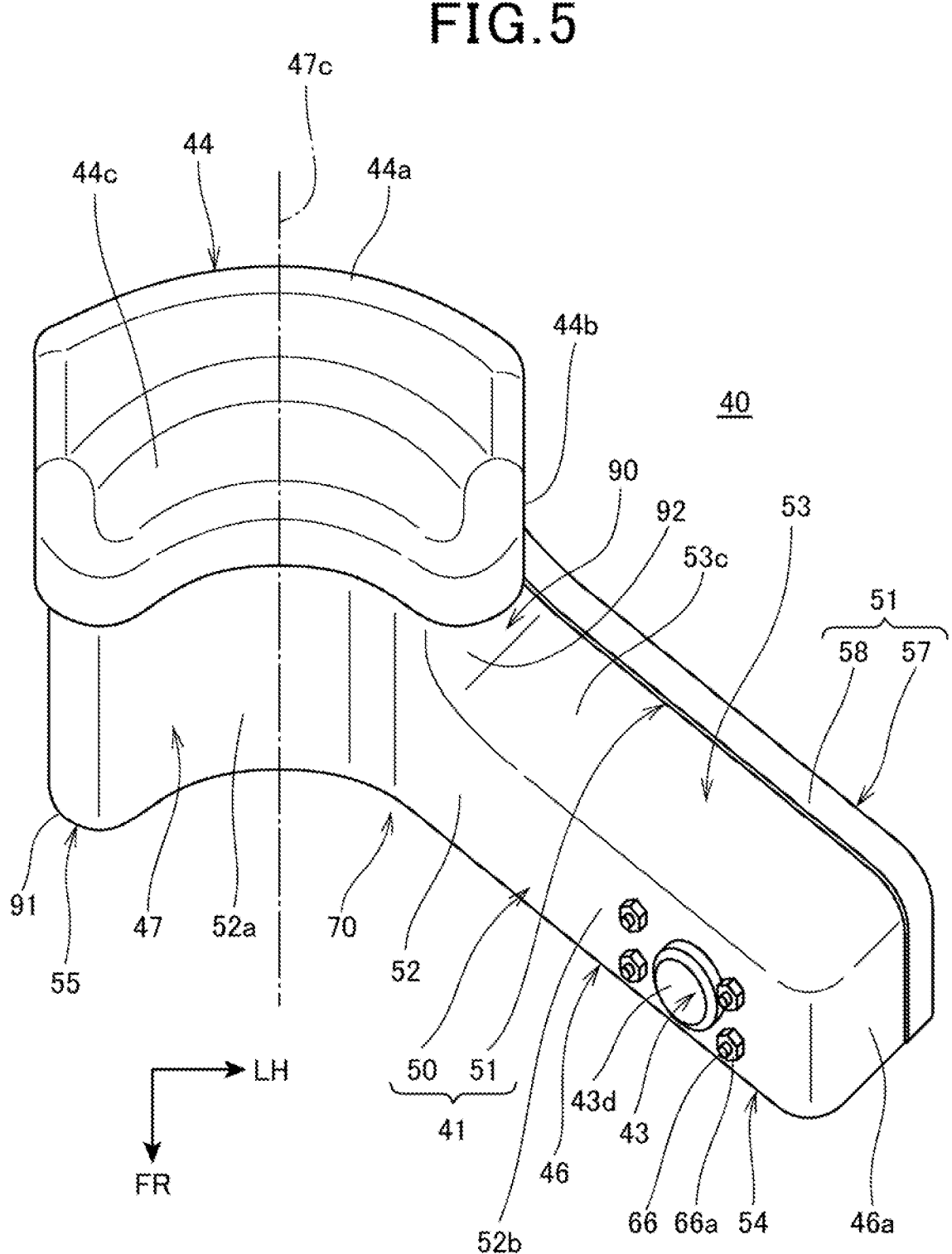
FIG. 5 is a diagram of the airbag device seen from above.
Figure 6:
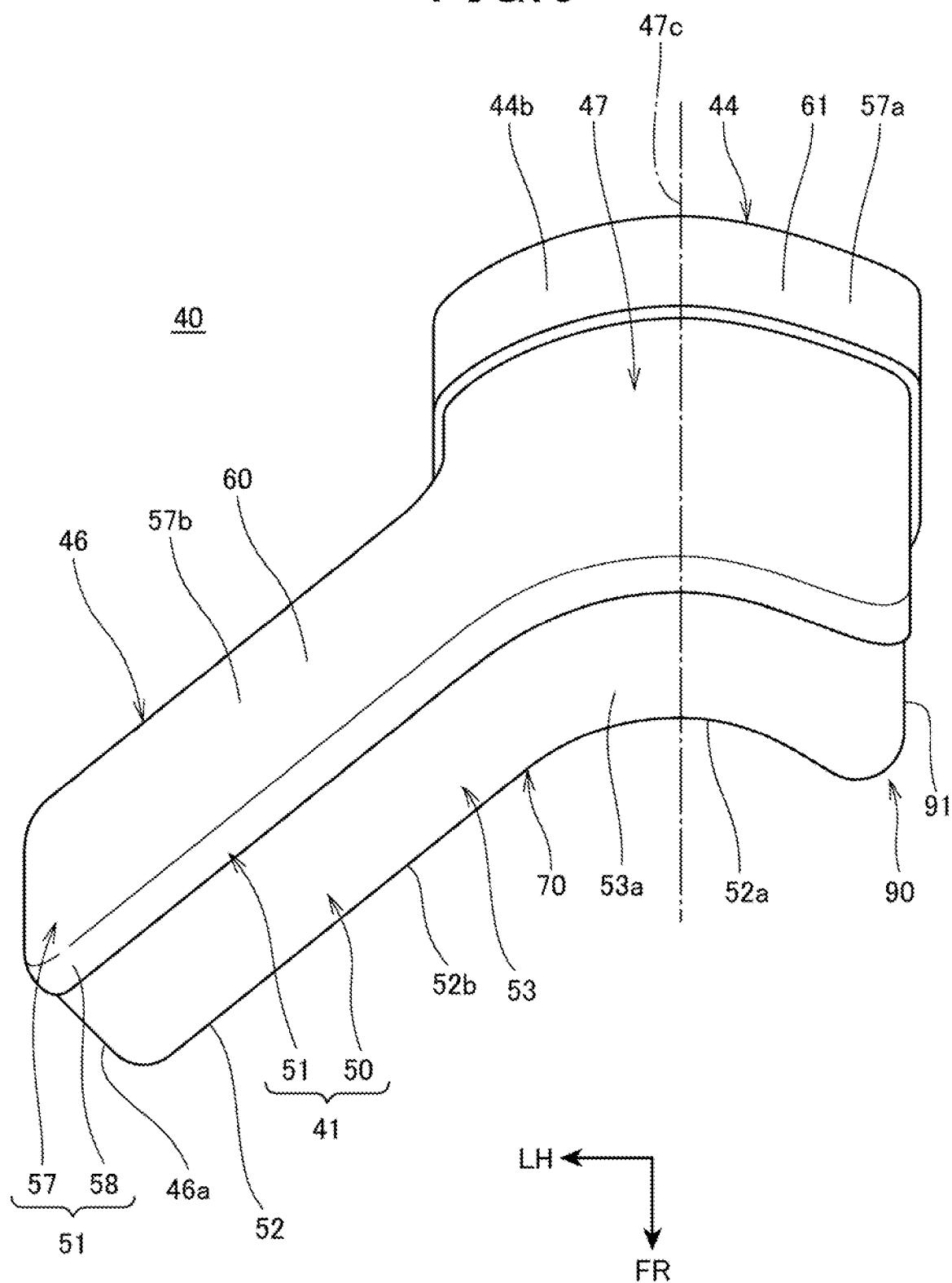
FIG. 6 is a diagram of the airbag device seen from below.

FIG. 4 is a left side view of the airbag device 40. FIG. 5 is a diagram of the airbag device 40 seen from above. FIG. 6 is a diagram of the airbag device 40 seen from below.

Referring to FIG. 2 to FIG. 6, the retainer 41 when seen from the rider side (rear side) is a box-shaped member formed into a reverse L shape. Note that the L shape in the following description means that the retainer 41 appears L-shaped when seen from the front or the rear. Although the retainer 41 appears reverse L-shaped when seen from the rear, it can be said that it is formed into an L shape.

The retainer 41 is positioned in front of the front-side seat 13a, facing the front surface of the front-side seat 13a.

The retainer 41 includes a left-right extending part 46 extending in the left-right direction (vehicle width direction) and an upward extending part 47 extending upward from the left-right extending part 46.

The left-right extending part 46 is a box-shaped part extending in the vehicle width direction. An outside end part 46a (FIG. 4) in the vehicle width direction of the left-right extending part 46 is positioned outside in the vehicle width direction the steering shaft 20 which is positioned at the vehicle width center. The left-right extending part 46 extends from the outside end part 46a to the vehicle width center along the rear surface of the side part 28b of the inner cover 28.

The upward extending part 47 is a box-shaped part extending in the up-down direction along the steering shaft 20 and falls rearward in a side view of the vehicle. The upward extending part 47 is positioned at the vehicle width center and covers the central part 28a of the inner cover 28 from the rear.

A center line 47c of the upward extending part 47 which extends in the up-down direction by passing through the center of the upward extending part 47 is provided substantially parallel to the steering shaft 20 in the rear of the steering shaft 20 and falls rearward. The center line 47c is positioned at the center of the vehicle width.

An inner end part in the vehicle width direction of the left-right extending part 46 is connected to the lower outer surface of the lower part of the upward extending part 47. That is, the retainer 41 is formed into an L shape by the upward extending part 47 extending upward from the inner end part of the left-right extending part 46. An L-shaped airbag passage 48 formed of an inner space of the left-right extending part 46 and an inner space of the upward extending part 47 is formed in the interior of the retainer 41.

A top surface opening 49 that exposes the airbag passage 48 upward is formed on the top surface of the upward extending part 47. The airbag 42 is deployed upward from the top surface opening 49. The opening surface of the top surface opening 49 is substantially orthogonal to the center line 47c of the upward extending part 47. The top surface opening 49 is closed with the cover member 44.

The retainer 41 is formed by connecting a box-shaped case 50, the rear surface (surface on the rider side) of which is opened with a cover 51 that covers the rear surface opening 50a (FIG. 7) of the case 50. The case 50 and the cover 51 are made of, for example, a metallic material.

Figure 7:
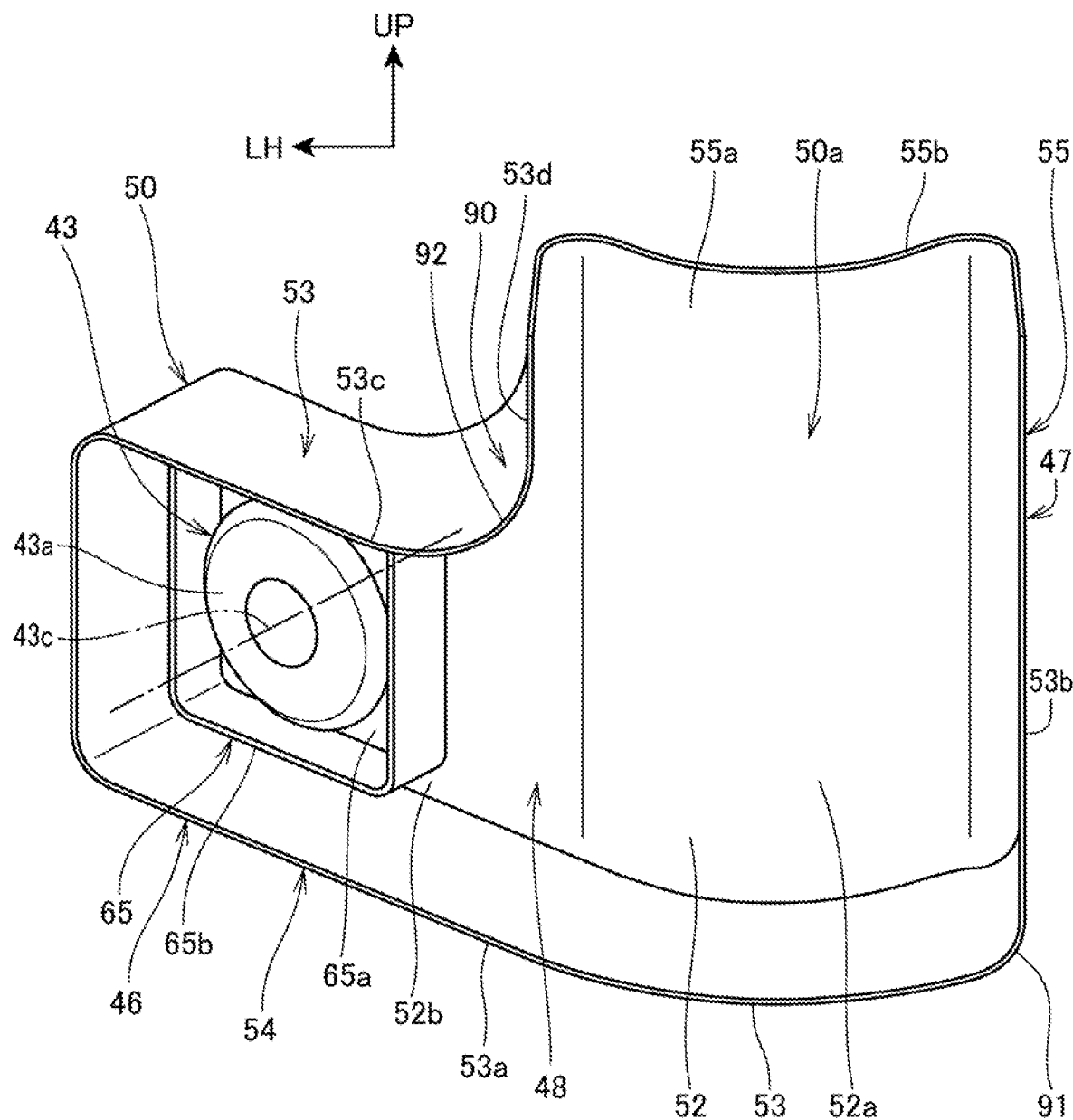
FIG. 7 is a diagram of a case seen from the rear.

FIG. 7 is a diagram of the case 50 seen from the rear.

The case 50 includes an L-shaped retainer front surface 52 and a peripheral wall part 53 (wall part) erected in the rear from the entire circumference of the periphery of the retainer front surface 52 other than the part of the case top surface opening 55a which will be described later. The rear surface opening 50a is partitioned by a trailing edge of the peripheral wall part 53.

The case 50 is integrally provided with a left-right extending case part 54 constituting the front of the left-right extending part 46 and an up-down extending case part 55 constituting the front of the upward extending part 47.

A case top surface opening 55a for which no peripheral wall part 53 is provided and which is opened is formed at the top end of the up-down extending case part 55. The case top surface opening 55a constitutes the most part of the top surface opening 49.

The part of the up-down extending case part 55 of the retainer front surface 52 constitutes a front-side curved surface part 52a (FIG. 5) which is curved to be convex rearward when seen from above. The front-side curved surface part 52a is provided over a substantially overall length in the up-down direction of the upward extending part 47.

The part of the left-right extending case part 54 of the retainer front surface 52 constitutes a front-side flat part 52b extending along the side part 28b (FIG. 2) of the inner cover 28.

As shown in FIG. 7, the case 50 is provided with a bent part 90 that bends the airbag passage 48 into an L shape. The bent part 90 is constructed of an outside bent part 91 that forms a corner part of L-shaped bending of the airbag passage 48 and an inside bent part 92 that forms an angular part of L-shaped bending.

To be more specific, as shown in FIG. 7, the outside bent part 91 is a part of the peripheral wall part 53 of the case 50 where a lower wall part 53a of the left-right extending case part 54 and a one-side side wall part 53b (right side face) of the upward extending part 47 cross each other in an L shape.

The inside bent part 92 is a part of the peripheral wall part 53 of the case 50 where an upper wall part 53c of the left-right extending case part 54 and an other-side side wall part 53d (left side face) of the upward extending part 47 cross each other in an L shape. The inside bent part 92 is formed in a curved surface shape such that the orientation of the peripheral wall part 53 gradually changes from the left-right direction to the upward direction.

Here, the upper wall part 53c of the peripheral wall part 53 is substantially parallel to the lower wall part 53a. The one-side side wall part 53b is substantially parallel to the other-side side wall part 53d.

Figure 8:
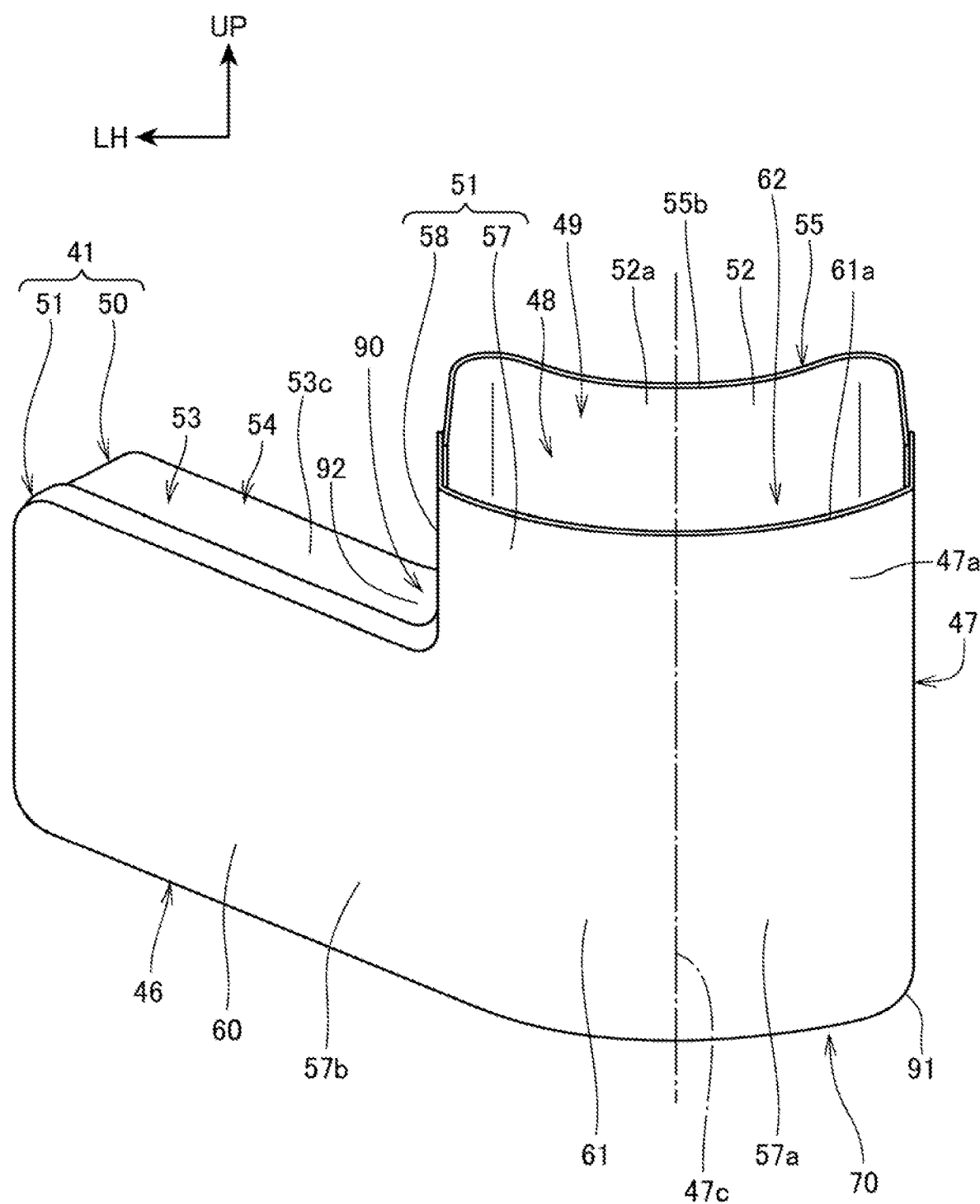
FIG. 8 is a front view of the airbag device from which the cover member is removed when seen from the rear side.
Figure 9:
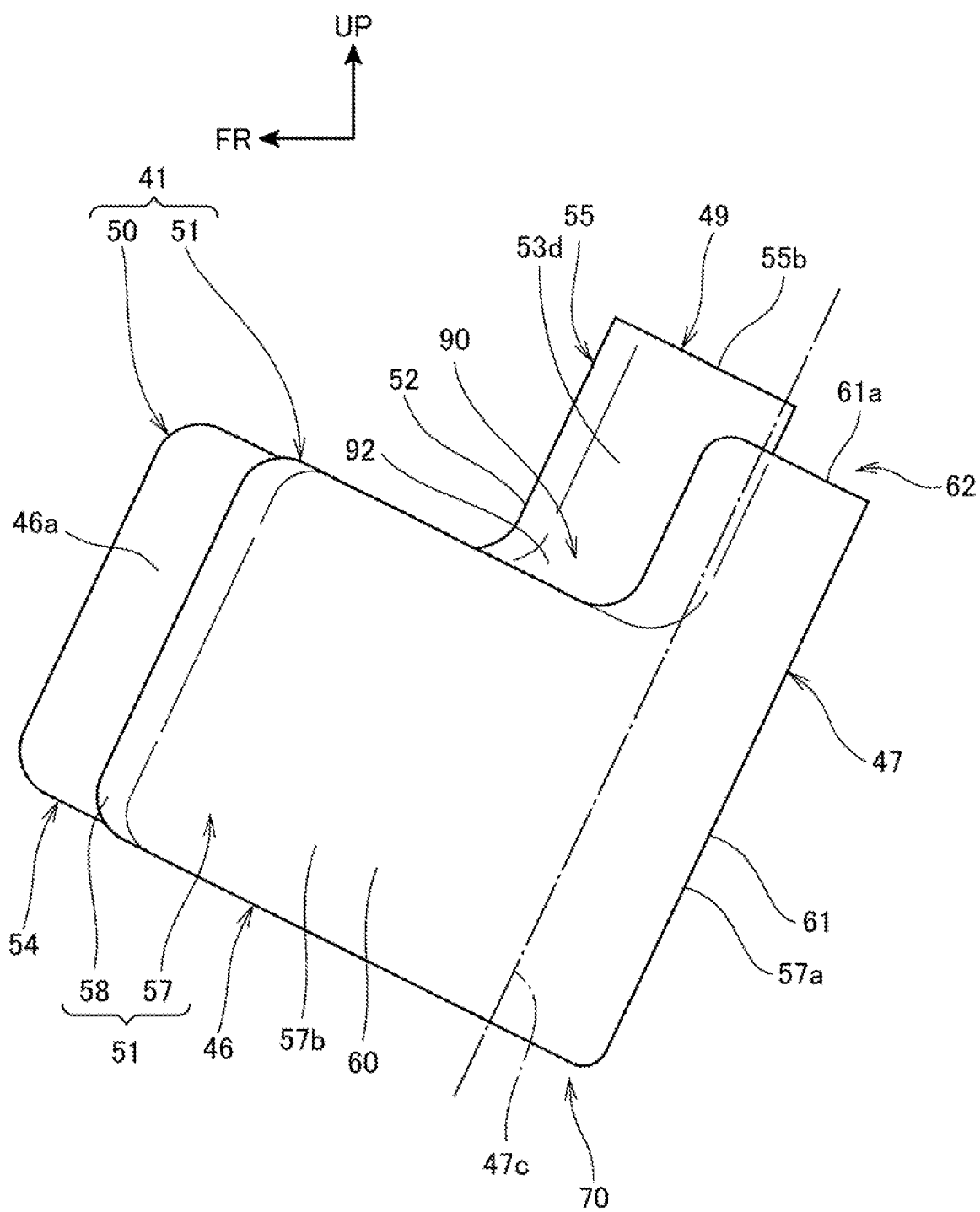
FIG. 9 is a left side view of the airbag device from which the cover member is removed.

FIG. 8 is a front view of the airbag device 40 from which the cover member 44 is removed when seen from the rear side. FIG. 9 is a left side view of the airbag device 40 from which the cover member 44 is removed.

The cover 51 of the retainer 41 includes a retainer rear surface 57 facing the rider and the seat 13 from the front side and a rib 58 erecting forward from the whole circumference of the peripheral edge of the retainer rear surface 57 other than the top end.

The retainer rear surface 57 is formed into an L shape as in the case of the retainer front surface 52 and faces the retainer front surface 52 from the rear.

The cover 51 is coupled with the case 50 by the rib 58 engaging with the peripheral wall part 53 of the case 50 so as to overlap from outside. The cover 51 is coupled with the case 50 by means of, for example, welding bead along the rib 58.

The retainer rear surface 57 of the cover 51 is integrally provided with a left-right extending cover part 60 constituting the rear surface of the left-right extending part 46 and an up-down extending cover part 61 constituting the rear surface of the upward extending part 47.

The up-down extending cover part 61 constitutes a rear-side curved surface part 57a (curved surface part) facing the front-side curved surface part 52a (FIG. 7, FIG. 8) of the case 50 from the rear. When seen from above, the rear-side curved surface part 57a is formed into a curved surface which is curved so as to be convex rearward. The rear-side curved surface part 57a is provided over a substantially overall length in the up-down direction of the retainer rear surface 57.

The left-right extending cover part 60 constitutes a rear-side flat part 57b facing the front-side flat part 52b (FIG. 7) of the case 50 from the rear.

The upward extending part 47 of the retainer 41 includes a frame-shaped upper peripheral wall part 47a when seen from above at the top end part. The top surface opening 49 is partitioned by the upper peripheral wall part 47a.

The upward extending part 47 of the retainer 41 includes a rider-side opening 62 which is opened toward the rider side in the rear. The rider-side opening 62 is cut out from the top end of the rear surface part of the upper peripheral wall part 47a downward and causes the top end part of the airbag passage 48 to communicate with the rear part. The rider-side opening 62 is positioned in the rear of the top surface opening 49 and communicates with the top surface opening 49.

More specifically, as shown in FIG. 8, the rider-side opening 62 is formed in such a way as to cut out the top end 61a of the up-down extending cover part 61 of the retainer rear surface 57 of the cover 51 downward from the top end 55b of the up-down extending case part 55 of the retainer front surface 52 of the case 50. The rider-side opening 62 is formed over the entire top end of the up-down extending cover part 61 in the width direction. The level difference between the top end 61a of the up-down extending cover part 61 and the top end 55b of the up-down extending case part 55 is substantially the same over the entire up-down extending cover part 61 in the width direction.

Note that the top end 61a is the top end of the rear surface part of the upper peripheral wall part 47a of the retainer 41 as well.

Referring to FIG. 3 to FIG. 6, the cover member 44 is integrally provided with a cover top surface part 44a that covers the top surface opening 49 from above and a cover peripheral wall part 44b that engages with the upper peripheral wall part 47a of the upward extending part 47.

The cover member 44 is attached to the retainer 41 with the inner surface of the cover peripheral wall part 44b engaging with the outer circumferential surface of the upper peripheral wall part 47a. The top surface opening 49 and the rider-side opening 62 are closed with the cover member 44.

A concave part 44c (FIG. 5) being dented downward to avoid the handle post 23a (FIG. 1) is formed in front of the cover top surface part 44a.

Referring to FIG. 2, FIG. 3, FIG. 5 and FIG. 7, the inflator 43 is provided in the airbag passage 48 and located at an upstream end of a deployment path of the airbag 42 in the airbag passage 48. More specifically, the inflator 43 is provided in proximity to an outside end part 46a (FIG. 5) side in the left-right extending case part 54 of the left-right extending part 46 and is disposed offset in the left-right direction (left side) with respect to the steering shaft 20 positioned at the vehicle width center.

The inflator 43 is attached to the front-side flat part 52b (FIG. 7) of the retainer front surface 52 of the left-right extending case part 54.

Figure 10:
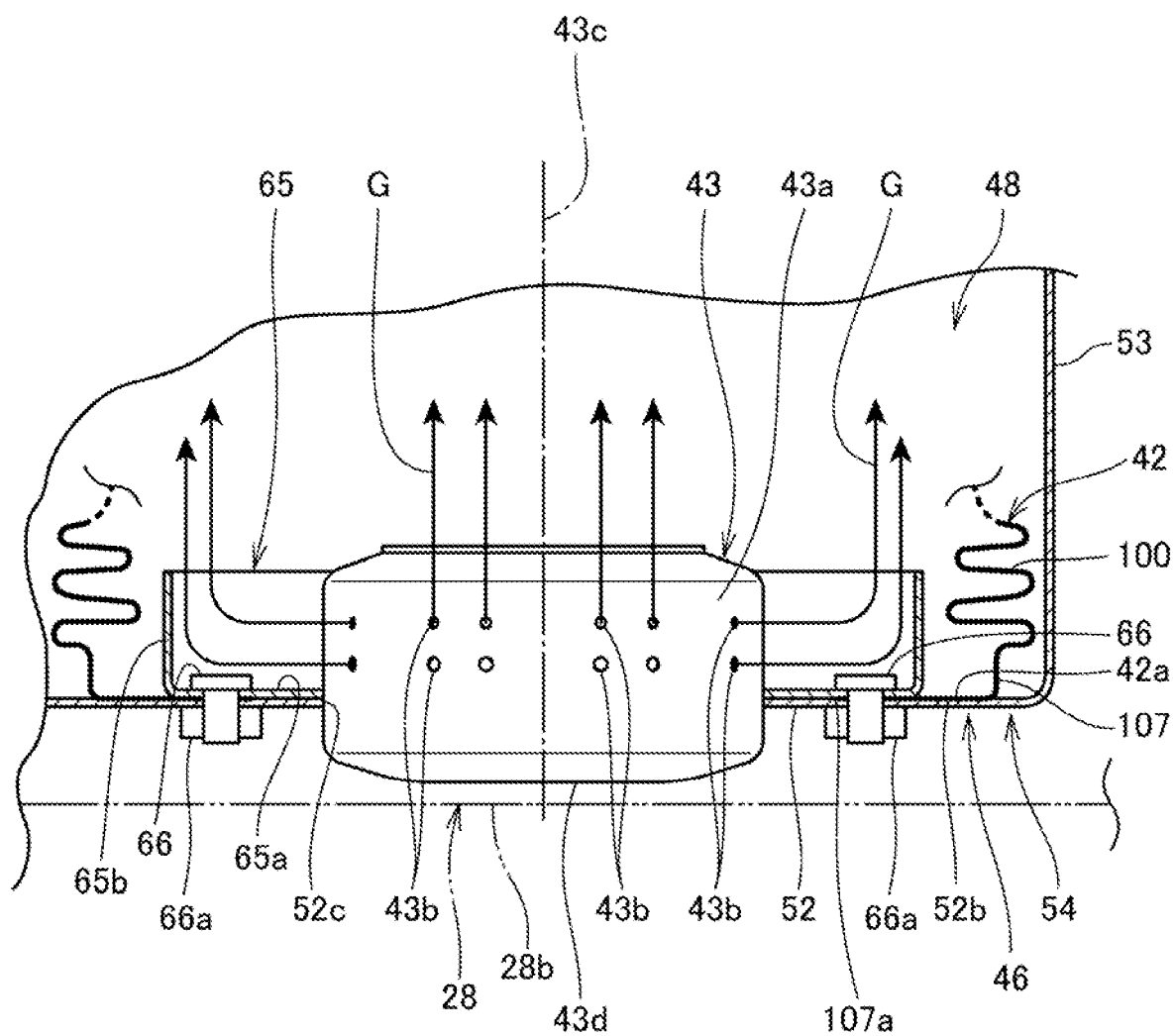
FIG. 10 is a cross-sectional view illustrating a state in which an inflator is attached.

FIG. 10 is a cross-sectional view illustrating a state in which the inflator 43 is attached.

The inflator 43 includes a cylindrically (tubularly) formed housing 43a. A gas generating agent and an initiator that starts reaction for generating a gas in the gas generating agent are provided in the housing 43a. The initiator includes an ignition device. Note that a closed axial end face of the housing 43a is also included in the cylindrical form. Gas discharging holes 43b are formed on an outer circumferential surface of the housing 43a. A plurality of gas discharging holes 43b are provided side by side in the circumferential direction of the housing 43a.

An annular member 65 is integrally connected to the outer circumferential surface of the housing 43a. The annular member 65 includes a flange part 65a that extends in a diameter direction from the outer circumferential surface of the housing 43a and a peripheral wall part 65b that extends in an axial direction of the inflator 43 from the outer circumferential edge of the flange part 65a.

The housing 43a of the inflator 43 is inserted into an inflator support hole 52c formed in the retainer front surface 52 from the inside of the left-right extending case part 54. The housing 43a is positioned in the axial direction of the inflator 43 with the flange part 65a coming into contact with the inner surface of the retainer front surface 52.

The inflator 43 is fastened to the retainer front surface 52 via bolts 66 inserted into the flange part 65a and the retainer front surface 52 and nuts 66a being screwed into the bolts 66. A plurality of the bolts 66 and the nuts 66a are provided in the circumferential direction of the flange part 65a.

The flange part 65a has a rectangular outline when seen in the direction of an axis 43c of the inflator 43.

The peripheral wall part 65b of the annular member 65 is formed into a rectangular frame shape in an axial direction view of the axis 43c to cover the outer circumferential surface of the inflator 43 from outside. More specifically, the peripheral wall part 65b covers the plurality of gas discharging holes 43b from outside.

The inflator 43 discharges a gas G radially from the plurality of gas discharging holes 43b toward the outside in the diameter direction and the gas G changes the direction by hitting the inner peripheral surface of the peripheral wall part 65b and is discharged in the direction of the axis 43c of the inflator 43. That is, the direction in which the gas G of the inflator 43 is discharged into the airbag 42 is the extending direction of the axis 43c. The annular member 65 functions as a guide member that controls the gas G discharge direction.

The inflator 43 is disposed in the direction in which the axis 43c is oriented toward the front-rear direction of the vehicle. With the axis 43c being oriented toward the front-rear direction in this way, even when the inflator 43 has a large diameter, it is possible to reduce the space the inflator 43 occupies in the front-rear direction of the vehicle and provide the inflator 43 compactly in the front-rear direction.

An upstream end 42a of the airbag 42 in the flow of the gas G is held between the flange part 65a of the annular member 65 and the retainer front surface 52 and is thereby fixed to the retainer 41. Furthermore, the airbag 42 is fixed to the retainer 41 with the bolts 66 being inserted into the upstream end 42a.

The peripheral wall part 65b of the annular member 65 is positioned between the gas discharging holes 43b and the upstream end 42a of the airbag 42 in the diameter direction of the inflator 43. This prevents the gas G discharged from the gas discharging holes 43b from directly hitting the upstream end 42a of the airbag 42 and protects the airbag 42 from the gas G.

The front-end part 43d of the inflator 43 projects from the inflator support hole 52c toward the inner cover 28 side in front of the retainer front surface 52. Since the inflator 43 is disposed on the inner cover 28 side, it is possible to prevent the inflator 43 from standing out and prevent the inflator 43 from protruding to the straddle space 34 side.

Referring to FIG. 3, the airbag 42 is shaped like a bag. The airbag 42 is housed in the L-shaped airbag passage 48 in such a way that a bag is folded therein and the airbag 42 is provided ranging from the left-right extending part 46 to the upward extending part 47. The airbag passage 48 is an airbag housing space.

The upstream end 42a (FIG. 10) of the airbag 42 is connected to the inflator 43 in the left-right extending part 46.

The motorcycle 1 includes an acceleration sensor (not shown) that detects an impact acting on the motorcycle 1. The acceleration sensor is electrically connected to a control part (not shown) of the motorcycle 1 and the control part is electrically connected to the inflator 43. The control part determines operation and non-operation of the airbag device 40 based on the detected acceleration. When operating the airbag device 40, the control part operates the inflator 43 to discharge a gas into the airbag 42. The airbag 42 is inflated under a pressure of the gas and deployed upward.

Figure 11:
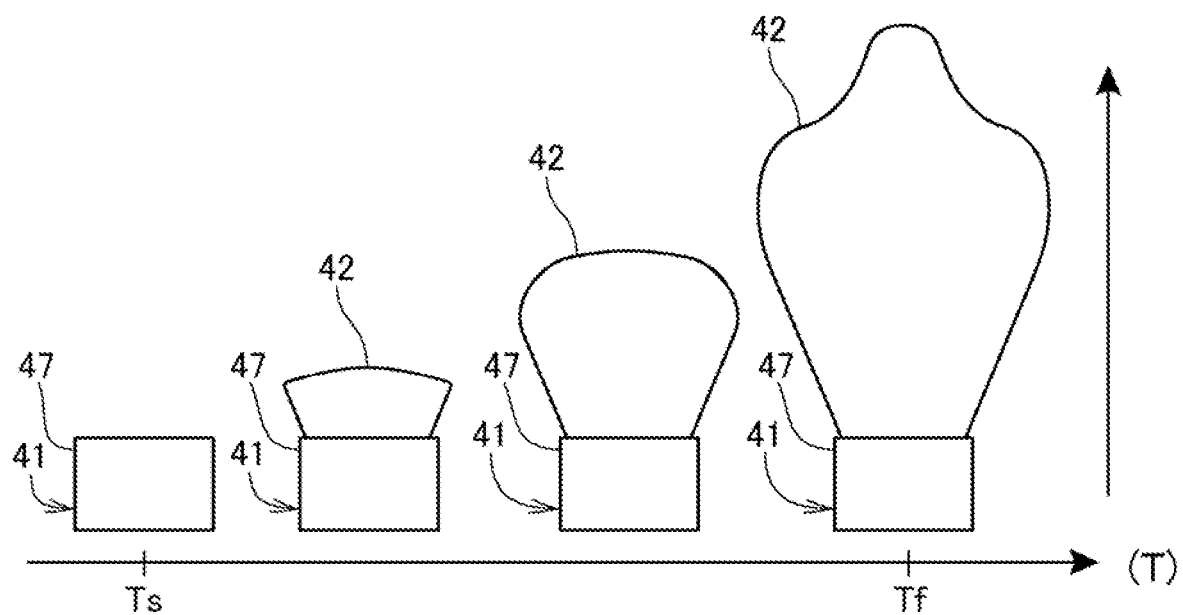
FIG. 11 is a diagram time-sequentially illustrating a state of deployment of the airbag.

FIG. 11 is a diagram time-sequentially illustrating a state of deployment of the airbag 42. The horizontal axis in FIG. 11 represents an elapsed time T. A time Ts represents operation timing of the inflator 43 and a time Tf represents timing at which deployment is completed.

As shown in FIG. 11, the airbag 42 is inflated in order at the lower part, the middle part and the upper part over time and deployed so as to extend upward.

Here, the flow of the gas G discharged from the inflator 43 will be described.

As shown in FIG. 3, the inflator 43 discharges the gas G into the airbag 42 toward the rear of the vehicle along the axis 43c. That is, the gas G discharging direction of the inflator 43 is the extending direction of the axis 43c. It can also be said that the inflator 43 discharges the gas G toward the driver side along the axis 43c.

More specifically, the inflator 43 is disposed obliquely according to the inclination of the side part 28b of the inner cover 28 and discharges the gas G in the direction of the inclined axis 43c. The axis 43c of the inflator 43 is inclined to be positioned outward and downward in the vehicle width direction as the axis 43c goes to the rear side.

Note that in the present first embodiment, the inflator 43 discharges the gas G rearward along the axis 43c, but the direction need not be right behind, and may be inclined within a predetermined angle range. For example, the axis 43c of the inflator 43 may be inclined with respect to the horizontal line extending rearward within a range of 45° in the up and down directions, respectively, in a side view of the vehicle. In a top surface view of the vehicle, the axis 43c may also be inclined with respect to the center line of the vehicle width within a range of 45° to the left and right, respectively.

Referring to FIG. 3 and FIG. 7, the gas G discharged from the inflator 43 into the airbag 42 is guided in its path by the left-right extending part 46 and the upward extending part 47, and flows through the airbag passage 48 in an L shape.

The gas G discharged rearward from the inflator 43 into the airbag 42 hits the inner surface of the left-right extending cover part 60 via the inner surface of the airbag 42, flows through the left-right extending part 46 in the left-right direction (right direction), and reaches the lower part of the upward extending part 47.

When flowing into the upward extending part 47, the gas G hits the inner surface of the rear-side curved surface part 57a of the up-down extending cover part 61 via the inner surface of the airbag 42 and smoothly changes the direction along the rear-side curved surface part 57a. In the upward extending part 47, the front-side curved surface part 52a also has a curved surface shape, and so the gas G can be guided smoothly.

When the gas G flows from the left-right extending part 46 to the upward extending part 47, the flow changes from the left-right direction to the upward direction, and flows upward through the upward extending part 47. That is, the left-right extending part 46 and the upward extending part 47 constitute a deflection part 70 that deflects the flow of the gas G from the left-right direction to the upward direction.

When the airbag 42 is inflated upward by the gas G flowing upward through the upward extending part 47, the cover member 44 is pushed by the airbag 42 and is burst open. The airbag 42 is deployed by the upward flowing gas G upward from the top surface opening 49.

As shown in FIG. 2, a main switch 80 for switching on/off power of the motorcycle 1 is provided on the opposite side of the inflator 43 across the upward extending part 47 of the retainer 41. The main switch 80 is provided so as to be embedded in the side part 28b of the inner cover 28.

Furthermore, a housing box 81 is provided above the inflator 43. The housing box 81 is provided on the opposite side of the main switch 80 across the upward extending part 47 of the retainer 41.

The housing box 81 includes a housing part (not shown) provided such that the side part 28b of the inner cover 28 is dented forward and a lid 81a that covers the housing part in an openable/closable manner.

Since the housing box 81 is positioned above the left-right extending part 46 and outside the upward extending part 47, the housing box 81 can be easily opened/closed even when the airbag device 40 is attached to the inner cover 28.

Next, a structure of the airbag 42 will be described.

Figure 12:
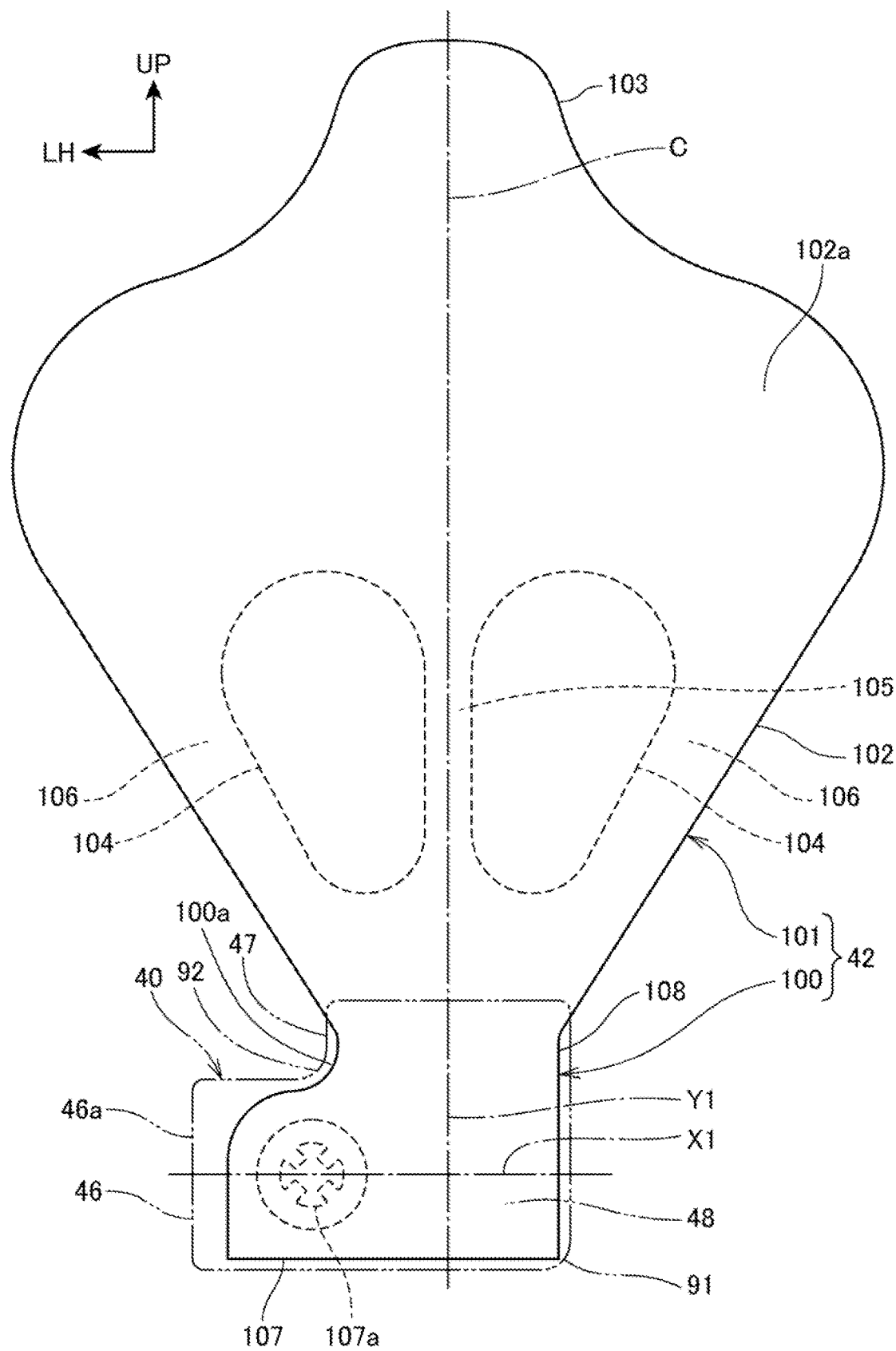
FIG. 12 is a diagram illustrating the airbag deployed from the retainer viewed from the rider side.

FIG. 12 a diagram illustrating the airbag 42 deployed from the retainer 41 viewed from the rider side.

The airbag 42 is a bag integrally provided with a proximal end part 100 located in the airbag passage 48 of the retainer 41 in a deployed state (FIG. 3 and FIG. 7) and an outside deployment part 101 located outside the airbag passage 48 in a deployed state.

The outside deployment part 101 is formed bilaterally symmetrical using the center line C (the left-right center line of the airbag) in the width direction (left-right direction) of the outside deployment part 101 as a reference. The airbag 42 is disposed so that the center line C is positioned at the center of the vehicle width. The center line C is located at the same position as the center line 47c (FIG. 3) of the upward extending part 47 of the retainer 41 in the vehicle width direction.

The outside deployment part 101 is provided with a deployment part body 102 that extends upward from the top end of the proximal end part 100 and a swollen part 103 that swells upward from the width direction center at the top of the deployment part body 102.

The deployment part body 102 is formed into a fan-shape extending upward from the bottom end which is a connection part with the proximal end part 100 while widening the left-right width. The deployment part body 102 is provided with a head-facing part 102*a* at which the left-right width becomes maximum at the top end part. The head-facing part 102*a* is a part supposed to receive the rider's head when the airbag 42 is actuated and deployed.

The swollen part 103 is a part supposed to come into contact with a collision object located ahead of the airbag 42 when the airbag 42 is actuated and deployed.

The deployment part body 102 and the swollen part 103 are provided bilaterally symmetrically using the center line C as a reference.

The deployment part body 102 is provided with a pair of intermediate sewing parts 104, 104 at positions between the proximal end part 100 and the head-facing part 102*a*. The intermediate sewing parts 104, 104 are provided bilaterally symmetrically using the center line C as a reference.

The intermediate sewing parts 104, 104 are parts where a front surface 101*a* (FIG. 1) and a rear surface 101*b* (FIG. 1) of the outside deployment part 101 are sewn and connected together along a peripheral edge thereof, and a gas G does not pass through the intermediate sewing parts 104, 104.

A constriction part 105 where the passage of the gas G becomes narrower than that on the upstream side is formed between the left-right intermediate sewing parts 104, 104. Furthermore, constriction parts 106, 106 where the passage of the gas G becomes narrower than that on the upstream side are formed between the left and right side parts of the outside deployment part 101 and the intermediate sewing parts 104, 104.

The constriction parts 105, 106, 106 narrow down the passage of the gas G on the upstream side of the head-facing part 102*a*, which causes the gas G to be supplied to the head-facing part 102*a* speedily.

The proximal end part 100 of the airbag 42 is provided with a bag left-right extending part 107 bilaterally extending through the left-right extending part 46 of the retainer 41 and a bag upward extending part 108 extending upward from the bag left-right extending part 107.

The bag left-right extending part 107 extends in the left-right direction from an outside end part 46*a* side of the retainer 41 to the center line C side.

The bag upward extending part 108 extends upward along the center line C through the upward extending part 47. The deployment part body 102 is continuous to the top end of the bag upward extending part 108.

That is, the proximal end part 100 is formed into an L-shape along the airbag passage 48 of the retainer 41 and is curved upward in the left-right direction.

When viewed from the rear as shown in FIG. 12, the angle at which an extending direction X1 of the bag left-right extending part 107 intersects with an extending direction Y1 of the bag upward extending part 108 is substantially the right angle similar to the bending angle of the L shape of the airbag passage 48.

The bag left-right extending part 107 extends in one direction of the vehicle width direction with respect to the center line C, the proximal end part 100 is formed bilaterally asymmetrical with respect to the center line C.

That is, the outside deployment part 101 of the airbag 42 is bilaterally symmetrically with respect to the center line C, whereas the proximal end part 100 is provided bilaterally asymmetrically with respect to the center line C along the L-shaped airbag passage 48.

The proximal end part 100 is provided with a curved portion 100*a* curved along an inside bent part 92 of the retainer 41 at a connection part between the bag left-right extending part 107 and the bag upward extending part 108. The gas G flows smoothly along the curved portion 100*a*.

A connection port 107*a* connected to the inflator 43 is provided in a portion of the front surface of the bag left-right extending part 107 on the outside end part 46*a* side. That is, the inflator 43 is disposed at a position bilaterally apart from the center line C. The gas G released by the inflator 43 flows in an L-shape through the bag left-right extending part 107 and the bag upward extending part 108.

The airbag 42 is housed in the retainer 41 in such a way that, of the proximal end part 100 and the outside deployment part 101, at least a portion of the outside deployment part 101 is folded. Note that the airbag may be housed in the retainer 41 in such a way that the proximal end part 100 is also folded.

As described above, according to the first embodiment to which the present invention is applied, the airbag device 40 for the motorcycle 1 is provided with the retainer 41 that is provided in front of the seat 13 for the rider, the inflator 43 and the airbag 42 that is housed in the retainer 41, is inflated by means of the gas G discharged from the inflator 43 and is deployed in front of the rider, in which the retainer 41 is provided with an L-shaped airbag passage 48 that causes the airbag 42 to deploy upward in the left-right direction, and in a deployed state, the airbag 42 is formed bilaterally asymmetrical with respect to the left-right center line C of the airbag 42.

According to this configuration, the L-shaped airbag passage 48 allows the airbag 42 to be arranged using the spaces in the left-right direction and in the up-down direction, allowing the airbag device 40 to be disposed compactly. Furthermore, since the airbag 42 is bilaterally asymmetrical with respect to the left-right center line C, the airbag 42 is deployed upward in the left-right direction along the L-shaped airbag passage 48. It is thereby possible to dispose the airbag device 40 compactly and deploy the airbag 42 vertically upward.

Furthermore, the airbag 42 is provided with the proximal end part 100 that is located in the airbag passage 48 in a deployed state and the outside deployment part 101 that deploys outside the airbag passage 48 in a deployed state, in which the proximal end part 100 is formed bilaterally asymmetrical with respect to the center line C. According to this configuration, the proximal end part 100 located in the airbag passage 48 can be deployed upward in the left-right direction along the L-shaped airbag passage 48. Thus, the airbag 42 can be deployed vertically upward.

Furthermore, the outside deployment part 101 is formed bilaterally symmetrical with respect to the center line C. According to this configuration, since the outside deployment part 101 deployed outside the retainer 41 is bilaterally symmetrical, the outside deployment part 101 is able to protect the rider appropriately.

Furthermore, the proximal end part 100 is curved upward in the left-right direction. This allows the proximal end part 100 to be deployed upward in the left-right direction along the curved portion. Therefore, the airbag 42 can be deployed vertically upward.

The inflator 43 is disposed at a position bilaterally apart from the center line C in the proximal end part 100. According to this configuration, the gas G of the inflator 43 flows upward in the left-right direction through the airbag passage 48. This makes it possible to deploy the proximal end part 100 upward in the left-right direction and deploy the airbag 42 vertically upward.

Second Embodiment

Hereinafter, a second embodiment to which the present invention is applied will be described with reference to FIG. 13. In this second embodiment, parts configured in the same way as in the first embodiment are assigned the same reference numerals and description will be omitted.

The second embodiment is different from the above first embodiment in that the shape of the proximal end part 200 is different from the proximal end part 100 and the like.

Figure 13:
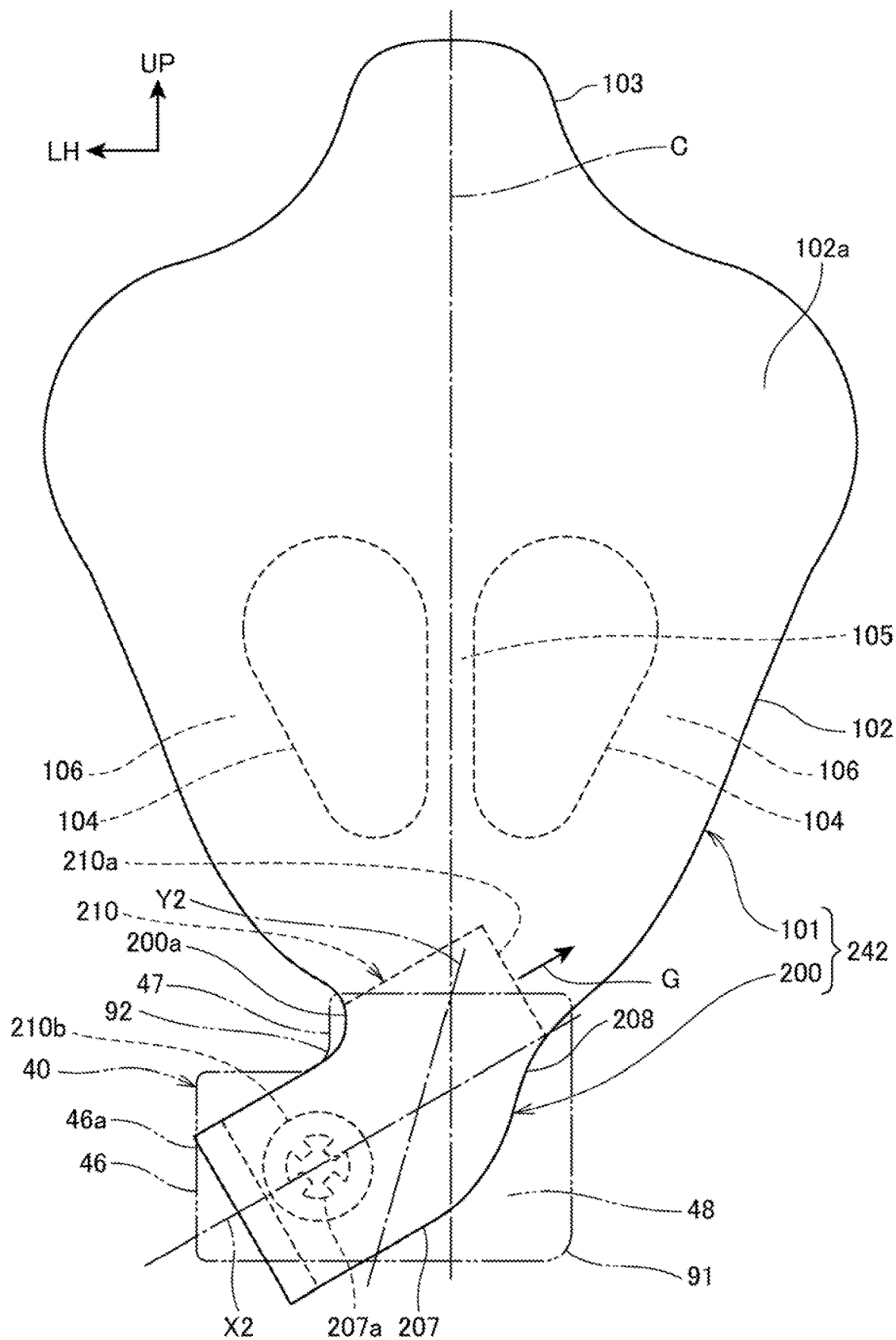
FIG. 13 is a diagram illustrating a state in which an airbag according to a second embodiment is deployed.

FIG. 13 is a diagram illustrating a state in which an airbag 242 according to the second embodiment is deployed.

The airbag 242, in a deployed state, is a bag integrally provided with a proximal end part 200 located in the airbag passage 48 (FIG. 3 and FIG. 7) of the retainer 41 and the outside deployment part 101.

The proximal end part 200 is provided with a bag left-right extending part 207 extending bilaterally through the left-right extending part 46 of the retainer 41 and a bag upward extending part 208 extending upward from the bag left-right extending part 207.

Although an angle at which an extending direction X2 of the bag left-right extending part 207 intersects with an extending direction Y2 of the bag upward extending part 208 is an angle larger than a right angle, the proximal end part 200 is formed into an L shape along the airbag passage 48 of the retainer 41.

The proximal end part 200 as a single unit is curved at an angle larger than the right angle as shown in FIG. 13, but when housed in the retainer 41, the proximal end part 200 is curved at substantially the right angle along the airbag passage 48.

The bag left-right extending part 207 extends from the outside end part 46a side of the retainer 41 to the center line C side in the left-right direction.

The bag upward extending part 208 extends upward along the center line C in the upward extending part 47. The deployment part body 102 is continuous to the top end of the bag upward extending part 208.

The bag left-right extending part 207 of the proximal end part 200 extends toward one side in the vehicle width direction with respect to the center line C and is formed bilaterally asymmetrical with respect to the center line C.

That is, in the airbag 242, although the outside deployment part 101 is bilaterally symmetrical with respect to the center line C, the proximal end part 200 is provided bilaterally asymmetrically with respect to the center line C along the L-shaped airbag passage 48.

In the proximal end part 200, a curved portion 200a that is curved along the inside bent part 92 of the retainer 41 is provided at a connection part between the bag left-right extending part 207 and the bag upward extending part 208. The gas G flows smoothly along the curved portion 200a.

A connection port 207a connected to the inflator 43 is provided at a position offset from the center line C in the vehicle width direction on the front surface of the bag left-right extending part 207.

The airbag 242 is provided with a flow-regulation cloth 210 that controls the flow of the gas G in the airbag 242.

The flow-regulation cloth 210 is formed into a bag shape with an opening 210a provided at one end thereof. The part of the edge of the flow-regulation cloth 210 other than the opening 210a shown by a straight line in FIG. 13 is closed.

The flow-regulation cloth 210 is disposed in the proximal end part 200 and extends from the inflator 43 side to a bottom end part of the outside deployment part 101. The flow-regulation cloth 210 is sewn with the inner surface of the proximal end part 200 and thereby combined with the airbag 242. At the location where the flow-regulation cloth 210 is provided, a shell of the bag constituting the airbag 242 has a plurality of layers.

The flow-regulation cloth 210 is provided with a connection part 210b connected to the inflator 43. The connection part 210b is provided so as to overlap the connection port 207a of the bag left-right extending part 207 from the inside. The gas G released from the inflator 43 directly flows into the bag of the flow-regulation cloth 210 from the connection part 210b and flows into the bag upward extending part 208 from the opening 210a.

The opening 210a is disposed so that the gas G released from the opening 210a flows upward along the extending direction X2 of the bag left-right extending part 207.

More specifically, the flow-regulation cloth 210 guides the flow of the gas G so that the gas G released from one side of the left and right sides to the proximal end part 200 based on the center line C flows to the other side of the left and right sides of the bag upward extending part 208 based on the center line C from the opening 210a.

Since the flow direction of the gas G from the inflator 43 can be controlled by the flow-regulation cloth 210, it is possible to control the order of filling the airbag 241 with the gas G and deploy the airbag 241 efficiently.

Note that the above-described first and second embodiments show an aspect to which the present invention is applied, but the present invention is not limited to the above-described embodiments.

In the above-described embodiments, the inflator 43 has been described as discharging the gas G into the airbag 42 toward the rear of the vehicle along the axis 43c, but the present invention is not limited to this. For example, a configuration may also be adopted in which the inflator 43 is provided on the cover 51 side and the gas is discharged in front of the vehicle along the axis 43c.

Furthermore, a configuration may also be adopted in which the retainer is provided in an L shape opposite to that shown in FIG. 2 with reference to the center line 47c and the gas flowing through the retainer from the right side to the vehicle width center is deflected upward.

Furthermore, although the motorcycle 1 has been taken as an example of the saddle riding vehicle in the above-described embodiments, the present invention is not limited to this, and the present invention is also applicable to a three-wheel saddle riding vehicle with two front wheels or rear wheels or a saddle riding vehicle with four or more wheels or the like.

REFERENCE SIGNS LIST 1 motorcycle (saddle riding vehicle)
13 seat
40 airbag device
41 retainer
42, 242 airbag
43 inflator
48 airbag passage
100, 200 proximal end part

101 outside deployment part
210 flow-regulation cloth
C center line

The invention claimed is:

1. A saddle riding vehicle airbag device comprising:
a retainer that is provided in front of a seat for a rider;
an inflator; and
an airbag that is housed in the retainer, is inflated by means of a gas discharged from the inflator and is deployed in front of the rider, wherein
the retainer comprises an L-shaped airbag passage that causes the airbag to deploy upward in a left-right direction,
the airbag comprises a proximal end part that is located in the airbag passage in a deployed state and an outside deployment part that deploys outside the airbag passage in a deployed state, and
the proximal end part is formed bilaterally asymmetrical with respect to a left-right center line of the outside deployment part.

2. The saddle riding vehicle airbag device according to claim 1, wherein the outside deployment part is formed bilaterally symmetrical with respect to the center line.

3. The saddle riding vehicle airbag device according to claim 1, wherein the proximal end part is curved upward in the left-right direction.

4. The saddle riding vehicle airbag device according to claim 1, wherein the inflator is disposed at a position bilaterally apart from the center line in the proximal end part.

5. The saddle riding vehicle airbag device according to claim 1, wherein the airbag internally comprises a flow-regulation cloth to guide the direction of the gas.

* * * * *